Nov. 11, 1947. J. W. SPEAKER Re. 22,934

POCKET TYPE CAN OPENER

Original Filed March 16, 1945

Inventor
John W. Speaker
By Dr. Shelton Jones
Attorney

Reissued Nov. 11, 1947

Re. 22,934

UNITED STATES PATENT OFFICE 22,934

POCKET TYPE CAN OPENER

John W. Speaker, Whitefish Bay, Wis.

Original No. 2,413,528, dated December 31, 1946, Serial No. 583,027, March 16, 1945. Application for reissue April 23, 1947, Serial No. 743,228

4 Claims. (Cl. 30—22)

This invention relates to can openers and has as its object to provide a compact practical pocket type can opener.

In its general aspects the can opener of this invention comprises a body portion and a cutting blade hingedly connected and so designed that the cutting blade may fold flat against the body portion when not in use, to be swung to a position substantially perpendicular to the body for use. Inasmuch as it is intended that the can opener be carried in the pocket, it is essential that its cutting edge be guarded when the opener is in its folded carrying condition.

To this end it is an object of this invention to provide novel detent means incorporated in the hinge connection between the parts for yieldingly holding the blade folded flat against the body.

Another object of this invention is to provide a can opener of the character described wherein the cutting is effected by a downward shearing action easily produced by rocking the opener on a fulcrum provided by one edge of a notch in the side of the body adapted to embrace the rim of the can.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates two complete examples of the physical embodiment of the invention constructed according to the best modes so far devised for the practical application of the principles thereof, and in which.

Figure 1:
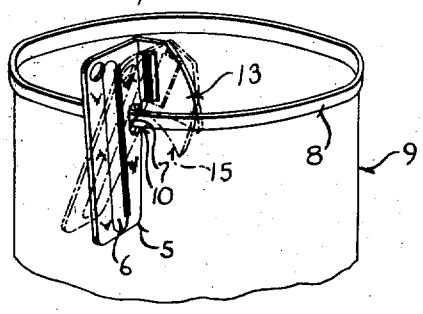
Figure 1 is a perspective view showing the can opener of this invention applied to a can and illustrating the manner of manipulating the same.

Referring now particularly to the accompanying drawing, in which like numerals indicate like parts, the numeral 5 designates the body of a can opener constructed in accordance with this invention. The body is stamped from sheet metal and has a longitudinal stiffening rib 6 extending substantially throughout the length thereof. A notch 7 is formed in one side edge of the body. This notch is of a size to embrace the rim 8 of a can 9 as shown in Figure 1.

The notch has a re-entrant shape which provides a sharp corner 10. This corner serves as a fulcrum point about which the body may be rocked during manipulation of the opener as illustrated in Figure 1.

Extended from the notched side edge of the body is a lip or loop 11 which passes through a slot 12 in a cutting blade 13 and is curled around the adjacent edge portion 14 of the blade. A hinge connection is thus established between the body and blade which consists of a curled lip or loop portion on the body and a trunnion portion on the blade. This hinge connection allows the blade to be swung from a position folded flat against the body as shown in Figure 2 to an extended position of use substantially perpendicular to the body as shown in Figure 3.

The curved cutting edge 15 of the blade terminates adjacent to the notch 7 as shown, and when the opener is in use acts with a clean, downward shearing action as the opener is manipulated, it being understood that after each cutting stroke the fulcrum point 10 is advanced along the rim of the can.

The operative extended position of the blade (substantially perpendicular to the body) is defined by the engagement of projections or arms 16 on the blade with the adjacent side edge portions 17 of the body.

Figure 2:
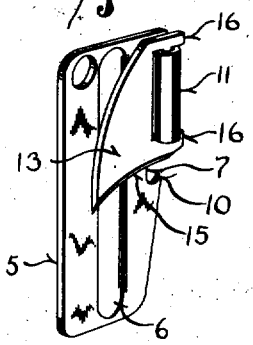
Figure 2 is a perspective view of the can opener with its cutting blade folded flat against the body.
Figure 3:
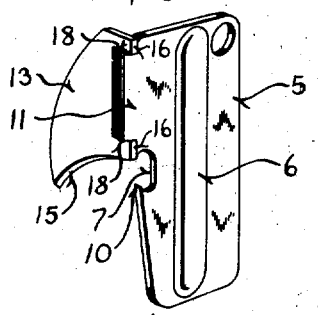
Figure 3 is a perspective view of the opener with its cutting blade swung out into operative position.
Figure 4:
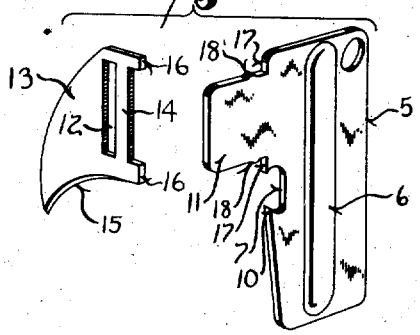
Figure 4 is a perspective view of the composite parts of the opener shown separated.

As shown in Figure 2, when the blade is folded flat against the body its cutting edge is guarded. To insure that the blade will be retained in this position against accidentally swinging out to an operative cutting position, detent means are incorporated in the hinge connection. This detent means comprises two small lugs or protrusions 18 on the opposite upper and lower edges of the lip 11 so located that when the blade is folded flat against the body its projections 16 snap over these lugs or protrusions and hold the blade flat against the body.

Attention is directed to the fact that the protrusions 18 are so positioned on the ends of the curled lips or loop portions as to engage the arms or projections 16 on that side thereof which faces the body when the blade is folded flat against the body. This throws the arms or projections 16 outwardly away from the plane of the body thus forcing the pointed end of the blade tightly against the side of the body.

It should also be noted that the inherent resiliency of the spaced arms or projections 16 is utilized in this arrangement to provide spring tension for the detent, the parts being so proportioned that the arms are slightly sprung apart as they ride over the protrusion.

It is, of course, essential that the cutting blade be hardened and it is desirable that the body be likewise hard. Thus, after the parts are assembled the unit is subjected to the customary hardening procedure.

Figure 5:
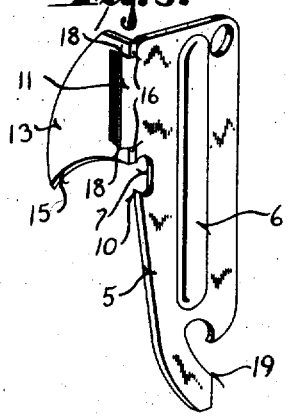
Figure 5 is a perspective view similar to Figure 3, but illustrating a slight modification of the invention.

From the foregoing description, taken in connection with the accompanying drawing, it will be readily apparent to those skilled in the art that this invention provides an exceptionally compact, highly practical can opener. It will also be apparent that the device may be provided with the conventional type of bottle cap remover 19 as illustrated in Figure 5.

I claim:

1. A can opener comprising: a body stamped from sheet metal and having a notch in one side edge thereof, said notch having a sharp corner whereby upon engagement of the notched portion of the body over the rim of a tin can said sharp corner may bite into the underside of a rim to provide a fulcrum about which the body may be swung during manipulation of the can opener; a lip extending from said side edge of the body adjacent to the notch, said lip being curled around to provide the female portion of a hinge connection; a cutting blade having a cutting edge and a slot along an adjacent edge through which the loop formed by the extended lip on the body passes so that said cutting blade is hingedly connected to the body with its cutting edge terminating adjacent to the notch in the body side wall; and a slight protrusion on the curled lip of the body lying in the path of an edge portion of the blade as the blade swings about its hinged connection with the body and over which said edge portion snaps as the blade is swung flat against the body, said protrusion being so located as to yieldingly retain the blade flat against the body.

2. A can opener comprising: a body stamped from sheet metal and having a notch in one side edge thereof adapted to embrace the rim of a can with one edge of the notch serving as a fulcrum about which the body may be rocked during manipulation of the opener; a lip projecting from said side edge of the body and curled around to provide a female portion of a hinge connection; a cutting blade having a slot adjacent to a straight edge thereof through which the curled lip of the body passes to hingedly connect the cutting blade to the body, the edge of the cutting blade adjacent to the notch in the body being curved and sharpened so that with the cutting blade substantially perpendicular to the body rocking motion of the body on the fulcrum provided by the engagement of an edge of its notch with the rim of the cam produces a downward cutting action; projections extended from said straight edge of the cutting blade engageable with the adjacent side edge of the body to limit movement of the cutting blade away from the body to substantially 90°; and small lugs on the opposite end edges of the curled lip on the body providing detents engageable with said projections on the cutting blade to yieldingly hold the cutting blade flat against the body.

3. A can opener comprising: a body member providing a handle; a blade member; means hingedly connecting said members in a manner enabling the blade member to be swung from an inoperative position folded flat against the body member to an operative position substantially perpendicular to the body member, said hinge connection comprising a curled lip on one of said members providing a tubular hinge part, the other of said members having a pair of arms projecting from one edge thereof and spaced to receive the tubular hinge part lengthwise therebetween, and pintle means on said arms entering the tubular hinge part; and a slight protrusion on an end of the curled lip so positioned that the adjacent arm rides up and over the protrusion during swinging of the blade member to inoperative position, whereby said protrusion holds the blade member against accidental displacement from its inoperative position.

4. A can opener comprising: two sheet metal stampings, one of which constitutes a handle member and the other a blade member; means hingedly connecting said members in a manner enabling the blade member to be swung from an inoperative position folded flat against the handle member to an operative position substantially perpendicular to the handle member, said hinge connection comprising, spaced hinge forming parts projecting from an edge of one of said members, a cooperating hinge forming part projecting from the adjacent edge of the other of said members and received between said spaced hinge forming parts, interengaging loop and trunnion portions on the said cooperating hinge forming parts; and a detent utilizing the inherent resiliency of the spaced hinge forming parts for yieldingly retaining the blade member folded flat against the handle member, said detent comprising, a slight protrusion on the end of a loop portion positioned to engage an adjacent edge of the hinge part having its trunnion portion received in said loop portion.

JOHN W. SPEAKER.

REFERENCES CITED

The following references are of record in the file of this patent:

UNITED STATES PATENTS

| Number | Name | Date |
|---|---|---|
| 1,054,477 | Weiss | Feb. 25, 1913 |
| 1,921,911 | Darque | Aug. 8, 1933 |